US008223959B2

(12) United States Patent
Grasley et al.

(10) Patent No.: US 8,223,959 B2
(45) Date of Patent: Jul. 17, 2012

(54) ECHO CANCELLATION IN WHICH SOUND SOURCE SIGNALS ARE SPATIALLY DISTRIBUTED TO ALL SPEAKER DEVICES

(75) Inventors: Scott Grasley, Lebanon, OR (US); David R Ingalls, Corvallis, OR (US); Otto Gygax, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1386 days.

(21) Appl. No.: 11/831,892

(22) Filed: Jul. 31, 2007

(65) Prior Publication Data

US 2009/0034712 A1    Feb. 5, 2009

(51) Int. Cl.
  *H04M 9/08*    (2006.01)
  *H04B 3/20*    (2006.01)
  *A61F 11/06*   (2006.01)
(52) U.S. Cl. .................. 379/406.1; 370/292; 381/71.11
(58) Field of Classification Search .................. None
  See application file for complete search history.

(56) References Cited

U.S. PATENT DOCUMENTS

| | | | |
|---|---|---|---|
| 5,204,908 A * | 4/1993 | Sims ............................. | 381/104 |
| 5,761,318 A * | 6/1998 | Shimauchi et al. ............. | 381/66 |
| 6,381,272 B1 | 4/2002 | Ali | |
| 6,408,327 B1 * | 6/2002 | McClennon et al. ......... | 709/204 |
| 6,424,720 B1 * | 7/2002 | Thomas et al. ................. | 381/66 |
| 7,006,616 B1 * | 2/2006 | Christofferson et al. | 379/202.01 |
| 7,085,374 B2 | 8/2006 | Schulz | |
| 2002/0021799 A1 | 2/2002 | Kaufholz | |
| 2004/0170284 A1 * | 9/2004 | Janse et al. ..................... | 381/66 |
| 2004/0174991 A1 | 9/2004 | Hirai et al. | |
| 2004/0247022 A1 | 12/2004 | Raghavan et al. | |
| 2005/0070243 A1 | 3/2005 | Schobben et al. | |
| 2005/0213747 A1 * | 9/2005 | Popovich et al. ........ | 379/406.03 |
| 2006/0002546 A1 | 1/2006 | Stokes, III et al. | |
| 2006/0002547 A1 | 1/2006 | Stokes et al. | |
| 2006/0093128 A1 * | 5/2006 | Oxford ..................... | 379/406.01 |
| 2006/0104458 A1 * | 5/2006 | Kenoyer et al. ................. | 381/92 |
| 2006/0188089 A1 | 8/2006 | Diethorn et al. | |
| 2007/0071230 A1 | 3/2007 | Schulz | |
| 2007/0121925 A1 | 5/2007 | Cruz-Zeno et al. | |
| 2007/0121926 A1 | 5/2007 | Le Gall et al. | |
| 2007/0127711 A1 | 6/2007 | LeBlanc | |

OTHER PUBLICATIONS

Lectrosonics, "LecNet2TM Sound System Design Guide," published Jun. 2, 2006, pp. 4-9, 16, and 22.*

* cited by examiner

*Primary Examiner* — Simon Sing
*Assistant Examiner* — Jeffrey Lytle

(57) ABSTRACT

A system includes microphone devices, echo cancellation mechanism, and speaker devices. Each echo cancellation mechanism corresponds to one of the microphone devices. Each speaker device corresponds to a sound source signal. Each sound source signal is spatially distributed to all the speaker devices, and each echo cancellation mechanism receives as a reference signal a combination of all the sound source signals.

21 Claims, 3 Drawing Sheets

ECHO CANCELLATION IN WHICH SOUND SOURCE SIGNALS ARE SPATIALLY DISTRIBUTED TO ALL SPEAKER DEVICES

BACKGROUND

Conferencing systems allow participants of a conference at one location to interact with participants of the conference at another location. A conferencing system typically includes at least a microphone at each location and a speaker at each location, where the microphone and the speaker at each location may be combined within a single device. The system may further include a video camera at each location and a display at each location, where videoconferencing is to be achieved instead of just simply audio conferencing or teleconferencing.

Before sound detected by a microphone at a first location is transmitted to a second location for emission by the speaker at the second location, echo cancellation is usually performed. Echo cancellation at the first location, for instance, involves at least substantially suppressing or removing any sound detected by the microphone at the first location that was emitted by a speaker at the first location, where such sound is that which was recorded by a microphone at the second location. Echo cancellation at the second location is typically performed in a similar manner. If echo cancellation is not performed, participants at the first location may hear their own voices from the speaker at their location, and likewise participants at the second location may hear their own voices from the speaker at their location, which can be unsettling.

Echo cancellation is usually performed well where there is just a single microphone and a single speaker at each location. However, more sophisticated conferencing systems can in particular include multiple speakers at each location. In such situations, echo cancellation is more difficult to achieve. For instance, echo cancellation may have to be performed for each speaker in relation to each microphone, or more generally for each sound source signal distributed among the speakers, in relation to each microphone. So-called multiple-channel echo cancellation can require relatively expensive and difficult-to-set-up equipment, however, which serves to limit widespread deployment of such more sophisticated conferencing systems.

DETAILED DESCRIPTION OF THE DRAWINGS

Figure 1:
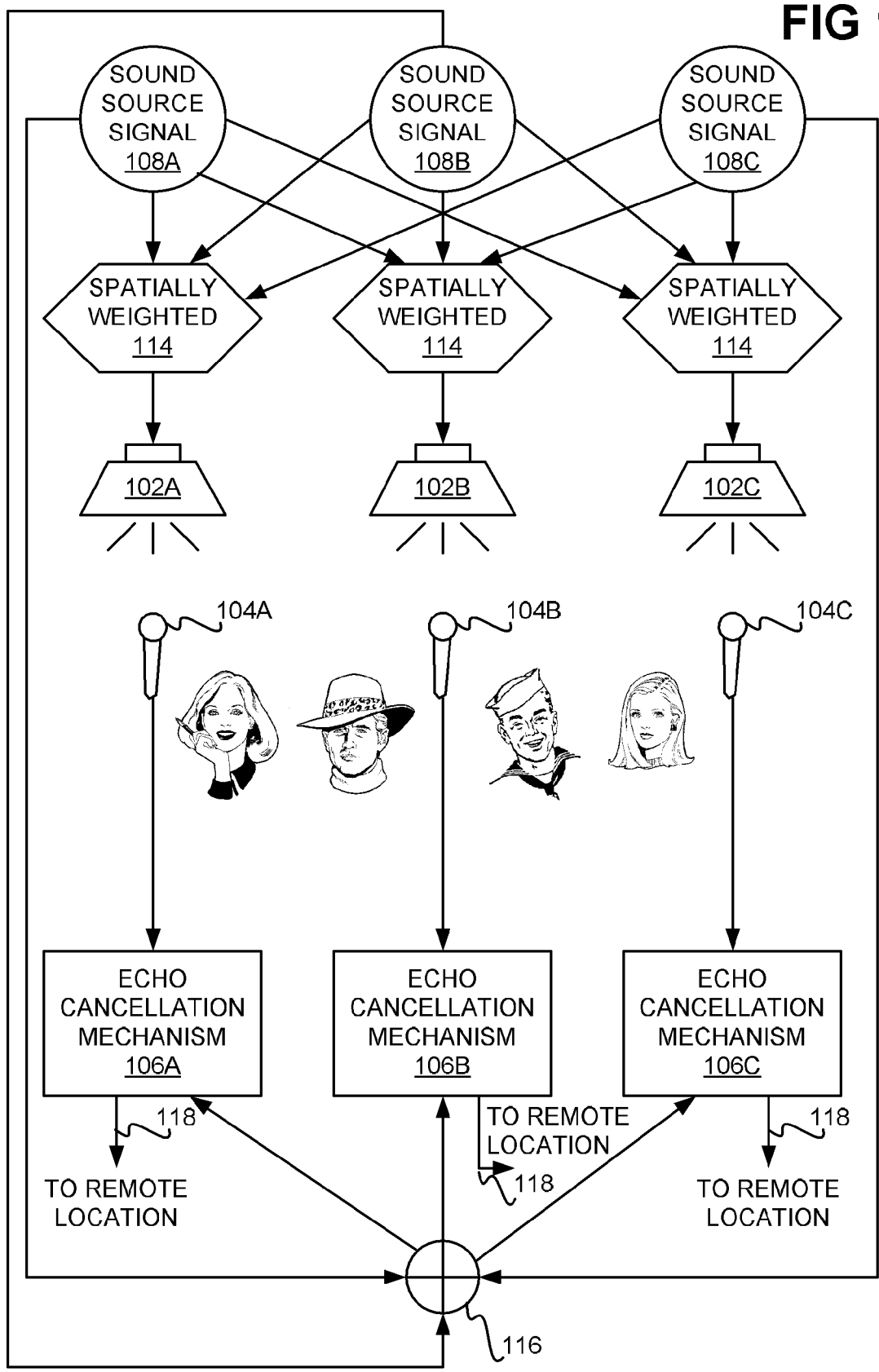
FIG. 1 is a diagram of a system in which sound source signals are spatially distributed to all speaker devices to improve echo cancellation, according to an embodiment of the present disclosure.

FIG. 1 shows a system 100, according to an exemplary embodiment of the present disclosure. The system 100 is a conferencing system, such as an audio conferencing, a videoconferencing, and/or a teleconferencing system. In particular the system 100 corresponds to one location at which conferencing occurs. For descriptive clarity and convenience, the location of the system 100 is referred to as the local location. A similar system to that depicted in FIG. 1 would thus be located at another location, which for descriptive clarity and convenience is referred to as the remote location. There may be more than one remote location in one embodiment as well.

The system 100 includes left, center, and right speaker devices 102A, 102B, and 102C, respectively, which are collectively referred to as the speaker devices 102. The system 100 also includes left, center, and right microphone devices 104A, 104B, and 104C, respectively, which are collectively referred to as the microphone devices 104. The system 100 further includes echo cancellation mechanisms 106A, 106B, and 106C, collectively referred to as the echo cancellation mechanisms 106, and where the mechanism 106A corresponds to the microphone device 104A, the mechanism 106B corresponds to the device 104B, and the mechanism 106C corresponds to the device 104C. Thus, there can be equal numbers of microphone devices 104 and echo cancellation mechanism 106.

The speaker devices 102 may each be or include one or more speakers, such as a single speaker, which emit sound. For example, one speaker device may be implemented as an array of speakers. The microphone devices 104 may each be or include one or more microphones, such as a single microphone, which detects sound. For example, one microphone device may be implemented as an array of microphones. The echo cancellation mechanisms 106 at least substantially suppress or remove the sound emitted by the speakers 102 from the sound detected by the microphones 104. The mechanisms 106 may be implemented in hardware, software, or a combination of hardware and software. The speaker devices 102, the microphone devices 104, and/or the echo cancellation mechanisms 106 may be disposed within common housings, or may be disposed within separate housings.

In general, the system 100 operates as follows. There are conference participants 110 at the local location of the system 100, who may be referred to as the local conference participants 110, or the local participants 110. The local participants 110 can speak to the conference participants at the remote location, who may be referred to as the remote conference participants, or the remote participants. The sound of the local participants 110 detected by the microphone devices 104 is transmitted to the remote location, as indicated by arrows 118, for emission by corresponding speaker devices at the remote location, so that the remote participants can listen to the local participants 110.

Likewise, the remote participants can speak to the local participants 110. The sound of the remote participants is detected by microphone devices at the remote location, and transmitted to the local location of the system 100. This sound is indicated as sound source signals 108A, 108B, and 108C, collectively referred to as the sound source signal 108. The sound source signals 108 are emitted by the speaker devices 102 at the local location, so that the local participants 110 can listen to the remote participants.

So that the remote participants do not hear themselves within the sound coming from the speaker devices at the remote location, the echo cancellation mechanisms 106 at least substantially suppress or remove the sound source signals 108 emitted by the speaker devices 102 as may be detected by the microphone devices 104. As can be appreciated by those of ordinary skill within the art, echo cancellation is typically performed by removing from sound detected by a local microphone device any sound that is emitted by a local speaker device. The sound that is emitted by the local speaker devices may be referred to as a reference signal; more particularly, the signal that is provided to the local speaker device(s) for emission by these device(s) can be referred to as a reference signal. Thus, the goal in echo cancellation is to just transmit the sound to the remote location that originated at the local location, and not to transmit back any sound that initially originated at the remote location, such as the voices of the remote participants.

It is noted that it is said that the echo cancellation mechanisms 106 at least substantially suppress, remove, or cancel the sound source signals 108 from or within the sound detected by the microphone devices 104. In general, the echo cancellation mechanisms 106, as can be appreciated by those of ordinary skill within the art, may be constantly adapting to the changing reference signal and to the changing sound source signals 108 emitted by the speaker devices 102. Therefore, at times the echo cancellation mechanisms 106 may not be able to completely suppress, remove, or cancel the sound source signals 108 from the sound detected by the microphone devices 104. However, as will be described herein, spatially distributing the sound source signals 108 to all the speaker devices 102, and providing a reference signal to the echo cancellation mechanisms 106 that is a combination of all the sound source signals 108, results in the echo cancellation mechanisms 106 achieving substantially optimal echo cancellation. That is, typically nearly all of the time, the sound source signals 108 are sufficiently suppressed, removed, or cancelled from or within the sound detected by the microphone devices 104 to the extent that any portion of the sound source signals 108 that are not suppressed, removed, or cancelled, are at least substantially imperceptible to the human ear within a typical conferencing environment.

In the case of the system 100, then, the echo cancellation mechanisms 106 substantially remove or suppress the sound source signals 108 emitted by the speaker devices 102 as may be detected by the microphone devices 104, so that at least substantially just the voices of the local participants 110 is transmitted to the remote location, as indicated by the arrows 118. In the embodiment of FIG. 1, the reference signal provided to each of the echo cancellation mechanisms 106 is identical. Specifically, the reference signal provided to each of the echo cancellation mechanisms 106 is a signal that represents a combination of the sound source signals 108. In particular, this reference signal may be a summation of all the sound source signals 108, as indicated by summation symbol 116. For instance, the reference signal may result from equally summing together the sound source signals 108.

In the embodiment of FIG. 1, the sound source signal 108A corresponds to the speaker device 102A, in that the sound source signal 108A is a left sound source signal 108A that is specifically intended to be emitted by the left speaker device 102A, as received from the remote location. Likewise, the sound source signal 108B corresponds to the speaker device 102B, in that the sound source signal 108B is a center sound source signal 108B that is specifically intended to be emitted by the center speaker device 102B, as received from the remote location. Similarly, the sound source signal 108C corresponds to the speaker device 102C, in that the sound source signal 108C is a right sound source signal that is specifically intended to be emitted by the right speaker device 102C, as received from the remote location. Thus, there may be equal numbers of speaker devices 102 and sound source signals 108.

However, to optimize echo cancellation by the echo cancellation mechanisms 106, the sound source signals 108 are spatially distributed among all the speaker devices 102. The sound source signals 108 are specifically distributed among the speaker devices 102 in that each of the speaker devices 102 emits all of the sound source signals 108 to some extent. Furthermore, such distribution is spatial in that how much of a given sound source signal is emitted by a given speaker device depends on the proximity (i.e., the spatial distance) of that speaker device to the speaker device that corresponds to sound source signal in question.

For example, the left sound source signal 108A is intended for emission by the left speaker device 102A, and indeed, the left speaker device 102A does emit the left sound source signal 108A. However, the center speaker device 102B and the right speaker device 102C also emit the left sound source signal 108A to some extent. Likewise, the left and the right speaker devices 102A and 102C emit the center sound source signal 108B to some extent, along with the center speaker device 102B. Similarly, the left and the center speaker devices 102A and 102B emit the right sound source signal 108C to some extent, along with the right speaker device 102C.

In one embodiment, such spatial distribution of the sound source signals 108 to each of the speaker devices 102 is achieved by spatially weighting each sound source signal based on the proximity of the speaker device in question to the speaker device to which the sound source signal in question corresponds, as indicated by blocks 114 in FIG. 1. For example, the left speaker device 102A emits the left sound source signal 108A at full amplitude (i.e., the amplitude at which the left sound source signal 108A may have been received from the remote location). This is because the proximity of the left speaker device 102A to the speaker device that corresponds to the left sound source signal 108A is essentially zero, insofar as the speaker device that corresponds to the left sound source signal 108A is the left speaker device 102A.

However, the center speaker device 102B emits the left sound source signal 108A at a (lesser) amplitude attenuated by a first level, and the right speaker device 102C emits the left sound source signal 108A at a (least) amplitude attenuated by a second level that is greater than the first level. The first level may be −7 decibels (dB), and the second level may be −10 dB, for instance. In this way, the left speaker device 102A is primarily responsible for emission of the left sound source signal 108A, insofar as it emits the left sound source signal 108A without amplitude attenuation. The emission of the left sound source signal 108A by the center speaker device 102B is amplitude-attenuated less than the emission of the left sound source signal 108B by the right speaker device 102C, because the center speaker device 102B is closer (i.e., more spatially proximate) to the left speaker device 102A than the right speaker device 102C is.

Assuming that the speaker devices 102 are equally spaced part, in that the distance separating the speaker devices 102A and 102B is equal to the distance separating the speaker devices 102B and 102C, the right sound source signal 108C may be emitted by the speaker devices 102 in a corresponding manner to that which has been described in relation to the left sound source signal 108A. For instance, the right speaker device 102C may emit the right sound source signal 108C at no amplitude attenuation. By comparison, the right sound source signal 108C may be attenuated by a first level, such as −7 dB, for emission by the center speaker device 102B, and by a second level, such as −10 dB, for emission by the left speaker device 102A.

Similarly, as to emission of the center sound source signal 108B by the speaker devices 102, the center speaker device 102B may emit the center sound source signal 108B at no amplitude attenuation. Next, it is assumed that as before that the distance separating the speaker devices 102A and 102B is equal to the distance separating the speaker devices 102B and 102C. Therefore, the center sound source signal 108B may be attenuated by a first level, such as −7 dB, for emission by each of the left speaker device 102A and the right speaker device 102C.

It has been found that spatially distributing, such as spatially weighting, the sound source signals 108 for emission by the speaker devices 102, and by combining the sound source signals 108, such as summing the signals 108, for providing as a reference signal to each of the echo cancellation mechanisms 106, optimizes echo cancellation without having to resort to a true multiple-channel echo cancellation topology. In a true multiple-channel echo cancellation topology, each of the echo cancellation mechanisms 106 has to independently compensate for (i.e., suppress or remove) each of the sound source signals 108, such that the sound source signals 108 are separately provided as multiple reference signals. In such a topology, then, there may even be, for each microphone device, a separate echo cancellation mechanism for each sound source signal, which would result in nine echo cancellation mechanisms in the example of FIG. 1.

By comparison, the embodiment of FIG. 1 leverages a single-channel echo cancellation topology within a multiple-sound source signal (i.e., a multiple-channel) environment. The echo cancellation mechanisms 106 do not independently compensate for (i.e., suppress or remove) each of the sound source signals 108, where the sound source signals 108 would then have to be separately provided as multiple reference signals. Rather, the sound source signals 108 are combined as a single reference signal that is provided to each of the echo cancellation mechanisms 106. It has been found that this approach provides for good echo cancellation results due to the fact that the sound source signals 108 are being spatially distributed to the speaker devices 102, such that each speaker device emits all the sound source signals 108, albeit at potentially varying amplitudes. The various weights by which the amplitudes of the sound source signals 108 as emitted by the speaker devices 102 are attenuated may be empirically determined for a given type of echo cancellation mechanism, to optimize echo cancellation.

The example that has been described in relation to FIG. 1 employs a left speaker device 102A, a center speaker device 102B, and a right speaker device 102C, to which a left sound source signal 108A, a center sound source signal 108B, and a right sound source signal 108C respectively correspond. In general, however, there is more than one speaker device 102 to which more than one sound source signal correspond, as can be appreciated by those of ordinary skill within the art. Likewise, the example that has been described in relation to FIG. 1 employs three microphone devices 104 for which there are three corresponding echo cancellation mechanisms 106. In general, however, there is at least one microphone device 104 for which there is at least one corresponding echo cancellation mechanism 106, as can also be appreciated by those of ordinary skill within the art.

Figure 2:
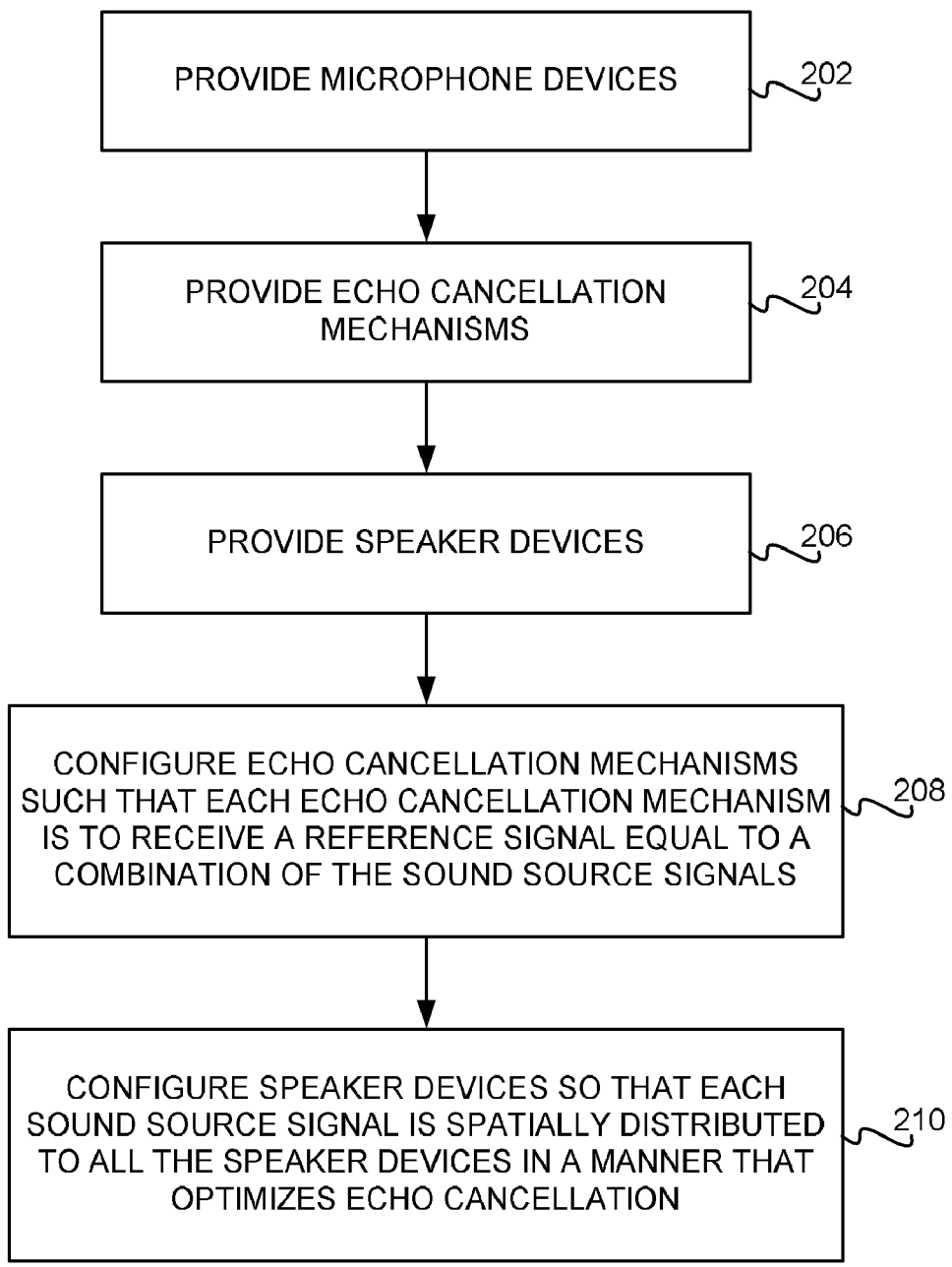
FIG. 2 is a flowchart of a method in which sound source signals are spatially distributed to all speaker devices to improve echo cancellation, according to an embodiment of the present disclosure.
Figure 3:
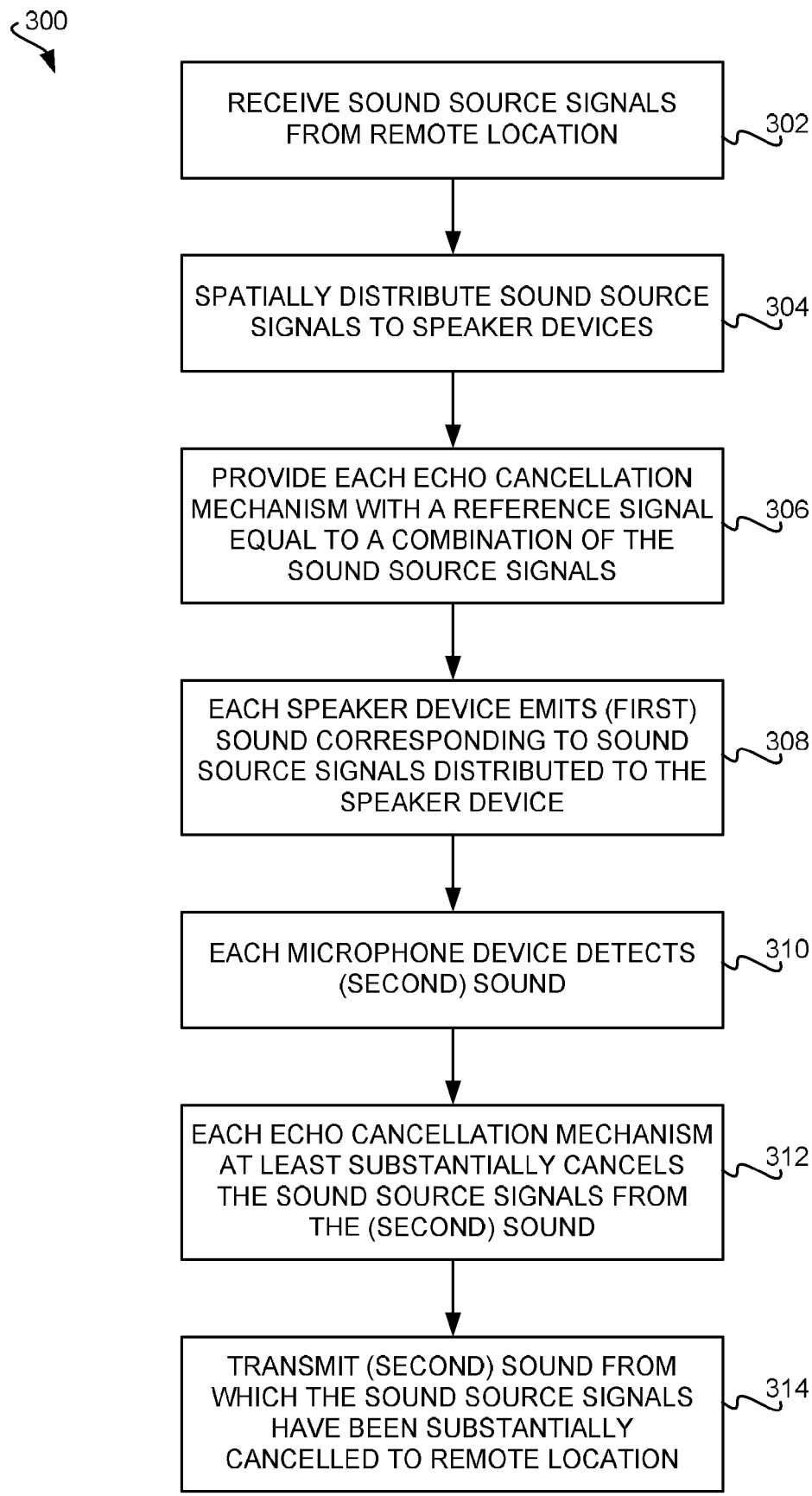
FIG. 3 is a flowchart of a method in which sound source signals are spatially distributed to all speaker devices to improve echo cancellation, according to another embodiment of the present disclosure.

FIG. 2 shows a method 200, according to an embodiment of the present disclosure, and FIG. 3 shows a method 300, according to another embodiment of the present disclosure. The method 200 is for setting up a system, such as the system 100, in which echo cancellation can be performed as has been described. By comparison, the method 300 is for using a system, such as the system 100, in which echo cancellation can be performed as has been described. The methods 200 and 300 are described in relation to the system 100. However, those of ordinary skill within the art can appreciate that the methods 200 and 300 can be employed in relation to other systems as well.

Referring first to FIG. 2, the microphone devices 104 are provided (202), the echo cancellation mechanisms 106 are provided (204), and the speaker devices 102 are provided (206). The echo cancellation mechanisms 106 are configured so that each echo cancellation mechanism is to receive a reference signal equal to a combination of the sound source signals 108 (208). For instance, each echo cancellation mechanism may be configured so that the reference signal it receives is the combination of all the sound source signals equally summed together.

The speaker devices 102 are configured so that each sound source signal is spatially distributed to all the speaker devices 102 in a manner that optimizes echo cancellation by the echo cancellation mechanisms 106 (210). For instance, for each sound source signal, each speaker device may be configured to receive the sound source signal at an amplitude corresponding to the proximity of the speaker device to the speaker device to which the sound source signal in question corresponds. As such, the speaker device to which a given sound source signal corresponds receives the sound source signal at full amplitude, while the other speaker devices each receive this sound source signal at a lesser amplitude corresponding to its proximity to the speaker device to which the sound source signal in question corresponds.

Referring next to FIG. 3, the sound source signals 108 are removed from a remote location (302), and are spatially distributed to the speaker devices 102 (304), such as has been described. Each echo cancellation mechanism is provided with a reference signal equal to a combination of the sound source signals 108 (306), such as has also been described. Each speaker device thus emits sound correspond to the sound source signals 108 that have been distributed to the speaker device in question (308). This sound is referred to as first sound just for descriptive clarity, to distinguish it from other sound that is detected by the microphone devices 104.

Thus, each microphone device detects sound (310), which is referred to as second sound just for descriptive clarity, to distinguish it from other sound that is emitted by the speaker devices 102. Each echo cancellation mechanism then at least substantially cancels (i.e., suppresses or removes) the sound source signals 108 from the (second) sound detected by a corresponding microphone device (312). The echo cancellation mechanisms 106 perform such echo cancellation by employing the reference signal provided to them in part 306, as can be appreciated by those of ordinary skill within the art. The (second) sound, from which the sound source signals 108 have been at least substantially cancelled, suppressed, and/or removed, is then transmitted to the remote location (314).

We claim:

1. A system comprising:
    a plurality of microphone devices;
    one or more echo cancellation mechanisms, each echo cancellation mechanism corresponding to one of the microphone devices; and,
    a plurality of speaker devices, each speaker device corresponding to a sound source signal,
    wherein each sound source signal is spatially distributed to all the speaker devices, and
    each echo cancellation mechanism is configured to receive as a reference signal a combination of all the sound source signals such that a signal from each microphone device is individually compared to said reference signal and adjust for each cancellation.

2. The system of claim 1, wherein the echo cancellation mechanisms are equal in number to microphone devices.

3. The system of claim 1, wherein the speaker devices are equal in number to the sound source signals.

4. The system of claim 1, wherein:
each echo cancellation mechanism is to at least substantially cancel the sound source signals from first sound detected by the microphone device to which the echo cancellation mechanism corresponds, based on the reference signal received by the echo cancellation mechanism, prior to transmitting the first sound detected by the microphone device to a location remote to the system, and
each speaker device emits second sound corresponding to all the sound source signals as spatially distributed to the speaker device, each sound source signal received from the location remote to the system.

5. The system of claim 1, wherein each sound source signal is spatially distributed to all the speaker devices such that, for each sound source signal, each speaker device receives the sound source signal at an amplitude that optimizes echo cancellation by each echo cancellation mechanism.

6. The system of claim 1, wherein each sound source signal is spatially distributed to all the speaker devices such that, for each sound source signal, each speaker device receives the sound source signal at an amplitude corresponding to a proximity of the receiving speaker device in relation to the speaker device to which the sound source signal corresponds.

7. The system of claim 1, wherein each sound source signal is spatially distributed to all the speaker devices in that, for each sound source signal, the speaker device to which the sound source signal corresponds receives the sound source signal at full amplitude, and each other of the speaker devices receives the sound source signal at a lesser amplitude corresponding to a proximity of the receiving speaker device in relation to the speaker device to which the sound source signal corresponds.

8. The system of claim 1, wherein the speaker devices comprise a left speaker device corresponding to a left sound source signal, a center speaker device corresponding to a center sound source signal, and a right speaker device corresponding to a right sound source signal.

9. The system of claim 8, wherein each sound source signal is spatially distributed to all the speaker devices in that:
the left speaker device receives the left sound source signal at an original amplitude, the center sound source signal at an amplitude attenuated by a first level, and the right sound source signal at an amplitude attenuated by a second level greater than the first level;
the right speaker device receives the right sound source signal at an original amplitude, the center sound source signal at an amplitude attenuated by the first level, and the left sound source signal at an amplitude attenuated by the second level; and,
the center speaker device receives the center sound source signal at an original amplitude, the left sound source signal at an amplitude attenuated by the first level, and the right sound source signal at an amplitude attenuated by the first level.

10. The system of claim 1, wherein each echo cancellation mechanism is to receive as a reference signal a combination of all the sound source signals in that each echo cancellation mechanism is to receive as a reference signal all the sound source signals equally summed together.

11. The system of claim 1, wherein one or more of:
each microphone device comprises a single microphone; and,
each speaker device comprises a single speaker.

12. A method comprising:
configuring a plurality of speaker devices, each speaker device corresponding to a sound source signal, the speaker devices configured such that each sound source signal is to be spatially distributed to all the speaker devices in a manner that optimizes echo cancellation by one or more echo cancellation mechanisms corresponding to one or more microphone devices; and,
configuring the echo cancellation mechanisms such that each echo cancellation mechanism is to receive as a reference signal a combination of all the sound source signals such that a signal from each microphone device is individually compared to said reference signal and adjusted for echo cancellation.

13. The method of claim 12, further comprising:
providing the microphone devices;
providing the echo cancellation mechanisms; and,
providing the speaker devices.

14. The method of claim 12, wherein the speaker devices are configured each sound source signal is to be spatially distributed to all the speaker devices in that, for each sound source signal, each speaker device receives the sound source signal at an amplitude corresponding to a proximity of the receiving speaker device in relation to the speaker device to which the sound source signal corresponds.

15. The method of claim 12, wherein the speaker devices are configured each sound source signal is to be spatially distributed to all the speaker devices in that, for each sound source signal, the speaker device to which the sound source signal corresponds receives the sound source signal at full amplitude, and each other of the speaker devices receives the sound source signal at a lesser amplitude corresponding to a proximity of the receiving speaker device to the speaker device in relation to which the sound source signal corresponds.

16. The method of claim 12, wherein the echo cancellation mechanisms are configured such that each echo cancellation mechanism is to receive as a reference signal a combination of all the sound source signals in that each echo cancellation mechanism is to receive as a reference signal all the sound source signals equally summed together.

17. A method comprising:
spatially distributing a plurality of sound source signals corresponding to a plurality of speaker devices to the speaker devices such that echo cancellation by one or more echo cancellation mechanisms corresponding to one or more microphone devices is optimized;
providing each echo cancellation mechanism with a reference signal, the reference signal being a combination of all the sound source signals; and
individually comparing a signal from each microphone device to said reference signal which is a combination of all the sound source signals to output a signal corresponding to each microphone that is adjusted for echo cancellation.

18. The method of claim 17, further comprising:
receiving each sound source signal from a remote location;
emitting first sound, by each speaker device, the first sound corresponding to all the sound source signals as spatially distributed to the speaker device;
detecting second sound by each microphone device;
at least substantially canceling the sound source signals within the second sound detected by each microphone device, by the echo cancellation mechanism corresponding to the microphone device, based on the reference signal provided to the echo cancellation mechanism; and, transmitting the second sound detected by each microphone device, within which the sound source signals have been at least substantially cancelled, to the remote location.

19. The method of claim 17, wherein:

spatially distributing the sound source signals to the speaker devices comprises, for each sound source signal, providing each speaker device with the sound source signal at an amplitude corresponding to a proximity of the speaker device to the speaker device to which the sound source signal corresponds, and providing each echo cancellation mechanism with a reference signal comprises providing each echo cancellation with a reference signal equal to all the sound source signals equally summed together.

20. The method of claim 17, wherein:

spatially distributing the sound source signals to the speaker devices comprises, for each sound source signal, providing the speaker device to which the sound source signal corresponds the sound source signal at full amplitude, and each other of the speaker devices the sound source signal at a lesser amplitude corresponding to a proximity of the receiving speaker device in relation to the speaker device to which the sound source signal corresponds; and providing each echo cancellation mechanism with a reference signal comprises providing each echo cancellation with a reference signal equal to all the sound source signals equally summed together.

21. A system comprising:

at least three microphone devices disposed in a teleconferencing location;

a cancellation mechanism receiving an output signal from all of said microphone devices;

at least three speaker devices, each speaker devices corresponding to a different sound source signal from at least a second teleconferencing location, wherein each speaker device receives its corresponding sound signal and also receives a spatially weighted version of each other sound source signal, each sound source signal being spatially weighted differently for receipt by different speaker devices, and wherein said echo cancellation mechanism receives as a reference signal a combination of all the sound signals and adjusts a signal from each microphone device individually for echo cancellation by comparing the signal from each microphone device to said reference signal.

* * * * *

UNITED STATES PATENT AND TRADEMARK OFFICE
CERTIFICATE OF CORRECTION

PATENT NO.         : 8,223,959 B2
APPLICATION NO.    : 11/831892
DATED              : July 17, 2012
INVENTOR(S)        : Scott Grasley et al.

Page 1 of 1

It is certified that error appears in the above-identified patent and that said Letters Patent is hereby corrected as shown below:

In the Claims:

In column 6, line 63, in Claim 1, delete "adjust, for each" and insert -- adjusted for echo --, therefor.

In column 8, line 31, in Claim 15, delete "device" and insert -- device in relation --, therefor.

In column 8, line 31, in Claim 15, after "device" delete "in relation".

In column 9, line 10, in Claim 19, delete "speaker device" and insert -- receiving speaker device in relation --, therefor.

In column 10, line 10, in Claim 21, delete "devices" and insert -- device --, therefor.

In column 10, line 14, in Claim 21, delete "sound" and insert -- sound source --, therefor.

In column 10, line 19, in Claim 21, delete "sound" and insert -- sound source --, therefor.

Signed and Sealed this
Twenty-first Day of May, 2013

Teresa Stanek Rea
*Acting Director of the United States Patent and Trademark Office*